(12) United States Patent
Obara

(10) Patent No.: US 6,527,447 B2
(45) Date of Patent: Mar. 4, 2003

(54) SLIDING OF POLYCRYSTALLIZED GLASS

(75) Inventor: Rikuro Obara, Miyota-machi (JP)

(73) Assignee: Minebea Co., Ltd., Miyota (JP)

( * ) Notice: Subject to any disclaimer, the term of this patent is extended or adjusted under 35 U.S.C. 154(b) by 0 days.

(21) Appl. No.: 10/068,958

(22) Filed: Feb. 11, 2002

(65) Prior Publication Data
US 2002/0097937 A1 Jul. 25, 2002

Related U.S. Application Data

(62) Division of application No. 09/419,978, filed on Oct. 18, 1999, now Pat. No. 6,345,915.

(30) Foreign Application Priority Data

Jul. 14, 1999 (JP) ............................................. 11-200325

(51) Int. Cl.⁷ ................................................. F16C 33/04
(52) U.S. Cl. ..................................... 384/297; 384/907.1
(58) Field of Search ................................. 384/129, 100, 384/276, 297, 907, 907.1

(56) References Cited

U.S. PATENT DOCUMENTS

| | | | |
|---|---|---|---|
| 1,980,081 A | 11/1934 | Ovington | 384/907.1 X |
| 2,534,929 A | 12/1950 | Schultz et al. | 384/492 X |
| 3,641,990 A | 2/1972 | Kinnersly | 384/907 X |
| 3,643,494 A | 2/1972 | Kammer | 73/629 |
| 3,799,630 A | 3/1974 | Chisholm | 384/125 |
| 4,118,237 A | 10/1978 | Beall et al. | 106/39.6 |
| 4,754,494 A | 6/1988 | Kumar | 384/907.1 X |
| 5,306,565 A | 4/1994 | Corbin et al. | 384/907.1 X |
| 5,593,234 A | 1/1997 | Liston | 384/492 |

FOREIGN PATENT DOCUMENTS

| | | |
|---|---|---|
| DE | 88 14 665 | 2/1989 |
| DE | 38 39 693 A1 | 5/1990 |
| DE | 42 35 838 A1 | 4/1993 |

Primary Examiner—Thomas R. Hannon
(74) Attorney, Agent, or Firm—Oliff & Berridge, PLC

(57) ABSTRACT

The inner ring 2 and the outer ring 3 of the roller bearing 1 as element are formed with silicate glass such as a high silicate glass, a soda-lime glass, alminosilicate glass, borosilicate glass and an alkali silicate glass, during its manufacturing processes a heat treatment is carried out for making the silicate glass polycrystalized and the thermal expansion coefficient of the inner ring 2 and the outer ring 3 diminished to prevent them from being changed minutely in dimension and the hardness and the strength of the rolling surfaces 2a, 3a increased to diminish the revolution vibration and the revolution noise due to the revolution vibration and prevent the impact due to miniaturization of the apparatus from being generated.

7 Claims, 3 Drawing Sheets

SLIDING OF POLYCRYSTALLIZED GLASS

This application is a division of application Ser. No. 09/419,978 filed Oct. 18, 1999, now U.S. Pat No. 6,345,915.

BACKGROUND OF THE INVENTION

1. Field of the Invention

The present invention relates to bearings including roller bearing and slider bearing, in particular, suitable for an apparatus driven by a high speed revolution with high quality precision, low vibration noise and low shock, and the method for manufacturing the same.

2. Related Art

Recently, for instance, in a spindle motor such as used for a memory apparatus in computer of magnetic type or optical type, due to a minute dimension change of bearing mechanism due to thermal expansion has become deteriorated in rotation precision to not disregarding extent.

Further, depending on kind of appliance, a revolution vibration to be generated at the bearing portion and a revolution noise coming from this vibration have become a big problem.

In addition, due to the miniaturization of appliances, there have been such problems as, since bearings to be used have been miniaturized too, an impact extent to be received by elements of bearing has become large, rollers or rolling surfaces of the rollers are easily damaged.

Also, the conventional bearings have been made, almost, of metals such as bearing steel and stainless steel, therefore, a thermal expansion coefficient has become relatively high and the effective decrease of the thermal expansion coefficient by a little variation of composite component is recognized to be extremely small, so that, against a deterioration of revolution precision due to the above minute change of size, an effective countermeasure has not found.

Further, since the generation of the above revolution vibration has been caused by a surface coarsening due to the wearing of the rolling surface in roller bearings and the bearing surface of sliding bearings and the engagement of different materials, the decrease of the surface coarsening becomes possible by increasing the hardness of the rolling surface or the bearing surface, however, concerning the above bearings made of metals there is a limitation for a high leveled hardening and it has been in a difficult situation to solve the generation of the revolution vibration and the sound derived from such vibration. Further, although the above the rolling surface and the bearing surface are finished by polishing, an abnormal surface layer (surface-softening layer) too influences the surface by causing to make the surface coarsened, which causes it more difficult to solve the problem of the revolution vibration.

Further, although the damages on the roller and rolling surfaces generated due to the increase of the impact because of miniaturization of appliances are to be related with the buckling strength, as to the above metal made bearings, since there is an limitation concerning the increase of the buckling strength, its solution has been in a difficult situation.

The present invention has been made to solve the various problems concerning the property of the material, and is to provide a bearing to cope effectively not only with the deterioration of revolution vibration due to the thermal expansion but also the generation of vibration noise due to the surface coarsening and the impact due to the miniaturization, and a method for manufacturing such bearings.

SUMMARY OF THE INVENTION

Bearings relating to the present invention are not limited to the type of roller bearing or sliding bearing, and in the case where it is structured as a roller bearing, whole of inner and outer rings or at least surface layer portion including rolling surface is formed with polycrystalline glass, on the other hand in case where it is structured as a sliding bearing, whole of a bearing body which receives a shaft or a surface layer or at least including bearing surface and the whole of the shaft or at least a surface portion to be received by the bearing body are formed with a polycrystalline glass.

Here, when forming as a roller bearing, whole of roller (ball, roller) or its surface layer may be formed with a polycrystalline glass.

And as a sliding bearing, there is a liquid circulating bearing and an air circulating bearing and the present invention may include such bearings.

In the bearings of the present invention, the above glass may be of any type of glass if it is able to be crystalized, and for example such as a silicate glass, a borosilicate glass and a phosphate glass can be used. However, of these glasses, the silicate glass is preferable from the view point of superiority in mechanical strength and heat resistance. In this case, as silicate glass, a high silicate glass (quartz crystal), a soda-lime glass, an alminosilicate glass, a borosilicate glass and alkali silicate glass. In such silicate glass, after being formed, it is crystalized by a heat treatment, and not only a coefficient of thermal expansion becomes small but also a hardness become higher, in addition, a mechanical strength, a heat resistance and an anti-corrosion will be increased.

In manufacturing the above bearing, when forming whole of the elements such as inner ring, outer ring, roller, bearing body using a molten glass, after forming a heat treatment may be carried out for crystalizing, on the other hand, in case where it is constructed as a sliding bearing, when only the surface layer of the above elements is to be formed with glass, after a base body of each element is made of a metal, a glass layer may be laminated on the surface of the base body, after that a heat treatment for crystalizing is carried out.

DETAILED DESCRIPTION OF PREFERRED EMBODIMENT

Hereinafter, embodiments of the present invention is described based on attached drawings.

Figure 1:
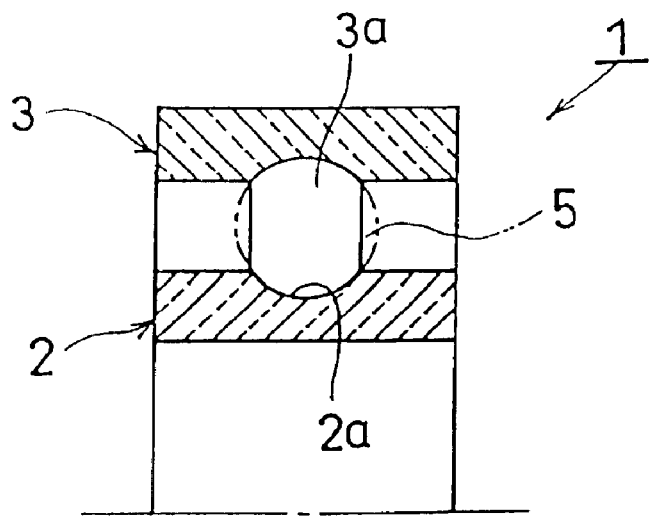
FIG. 1 shows a sectional view of main structure of the roller bearing as first embodiment of the present invention.
Figure 2:
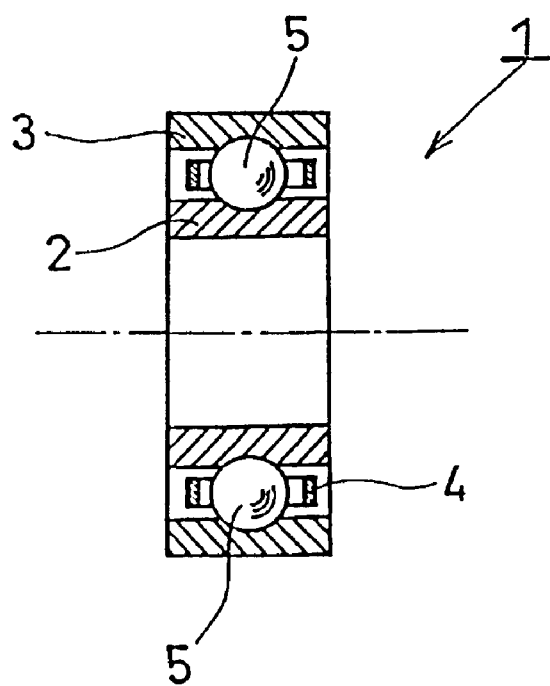
FIG. 2 shows a sectional view of the whole structure of the roller bearing of the present invention.

FIGS. 1 and 2 show a roller bearing as a first embodiment of the present invention. The basic structure of this roller bearing 1 is same to the conventional one, in which a plurality of balls 5 (roller) are disposed and held between an inner ring 2 and an outer ring 3 through a retainer 4. In the embodiment, of the elements of the roller bearing 1, whole of the inner ring 2 and the outer ring 3 are formed with the polycrystalized silicate glass, such as selected one of a high silicate glass (crystal glass), soda-lime glass, alminosilicate glass, borosilicate glass and alkali silicate glass.

Figure 3:
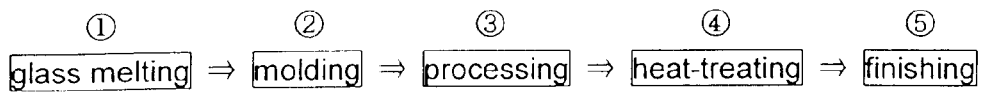
FIG. 3 shows a block diagram illustrating manufacturing steps in first embodiment of the present invention.

In manufacturing the above inner ring 2 and the outer ring 3, as shown in FIG. 3, first, a given amount of glass material which is measured in such a manner as the amount of the material is arranged so as to become a given component composition is applied to an electric melting furnace and melted at the given temperature (1450–1650° C.)(①), subsequently such molten glass is poured in the mold to obtained a molded product approximately similar to the inner ring 2 and outer ring 3 (②). Next, a ball rolling surface (roller rolling surface) and the retainer guide groove of thus obtained molded product are worked (cutting, polishing) and, if necessary, working of the inner diameter, outer diameter and end portion is carried out (③), hereinafter, a heat treatment is carried out for polycrystalizing of the glass at a predetermined temperature (1000–1600° C.) in accordance with the kind of glass (④). And, as a finishing treatment, on the rolling surface of the ball, a chemical polishing such as a hydrofluoric acid solution is applied to obtain a mirror finishing of the ball rolling surface, to the portion other than the ball rolling surface, by chance, a surface alteration treatment is applied through ion exchanging, thereby the inner ring 2 and the outer ring 3 are finished.

Since the silicate glass which is used for manufacturing the above inner ring 2 and outer ring 3 becomes small in the coeeficient of thermal expansion due to the polycrystalization by the post heat treatment (process④), the roller bearing 1 consisting of the inner ring 2 and outer ring 3 having such material property is reduced in the minute change of the size due to the thermal expansion in actual use. As a result, a deterioration of the revolution precision due to the minute dimension change is prevented from being generated in advance, which makes it suitable for a spindle motor which is used for the appliances for requiring a high revolution precision such as magnetic or optical memory apparatus for a computer.

For reference, the coefficients of thermal expansion of the polycrystalized quartz glass, alminosilicate glass and normal ferrous material (bearing steel, stainless steel) are as follows.

| | |
|---|---|
| Quartz glass | 0.0000006 (100–300° C.) |
| Alminosilicate glass | 0.0000043 (100–300° C.) |
| Ferrous material | 0.00001–0.0000135 (100–400° C.) |

That is, the thermal expansion coefficient of the quartz glass is outstandingly small compared with the one of the ferrous material, further even in the alminosilicate glass, it is less than half of it.

Further, according to the roller bearing 1, the hardness of the ball rolling surface 2a, 3a (FIG. 1) becomes high due to the polycrystalized silicate glass, in addition, since the mechanical strength is increased, the surface coarsening due to wearing and being engaged with the dusts is prevented, and the revolution noise and a rotation sound derived from the revolution vibration are able to be removed. In addition, the rolling surface 2a, 3a are, even after being cut working (process ③ and ⑤ of FIG. 3), since there is no generation of a surface softening layer due to a degeneration by the cutting heat like in the inner and outer rings made of ferrous materials, the above surface coarsening is prevented more than before.

For reference, the hardness of each silicate glass after heat treatment is compared with one of conventional bearing steel after heat treatment, the former shows Hv 570–790 in Vickers hardness and the latter shows likewise Hv 510–610, accordingly in the present invention, the ball rolling surface 2a, 3a having a high hardness can be provided.

Further, according to the roller bearing 1 of the invention, since the heat resistance and the anti-corrosion of the inner ring 2 and the outer ring 3 are increased, correspondingly when the ball 5 and the retainer 4 are made of the material superior in the heat resistance or anti-corrosion, these can be used stably even in a high temperature or highly corrosive environment, an applicable area of which may be more enlarged.

Now, as to the ball 5, compared with the inner ring 2 and outer ring 3, it is small outstandingly in the diameter, the above minute change in dimension due to the thermal expansion can be disregarded, accordingly if the ball 5 is formed with a ferrous material such as a conventional bearing steel and a new ceramics comprising of a various kind of oxides, nitride and carbide, there will be no problem. It is a matter of course to form this ball 5 may be effectively made of silicate glass as well as the inner ring 2 and the outer ring 3, whereby a deterioration in revolution precision due to minute change in dimension is more securely prevented.

Further, as to the retainer 4, retainer made from conventional ferrous material may be used, however, from the view point of anti-corrosion, it is preferably made of a resin or anti-corrosive sintered metal alloy.

Figure 4:
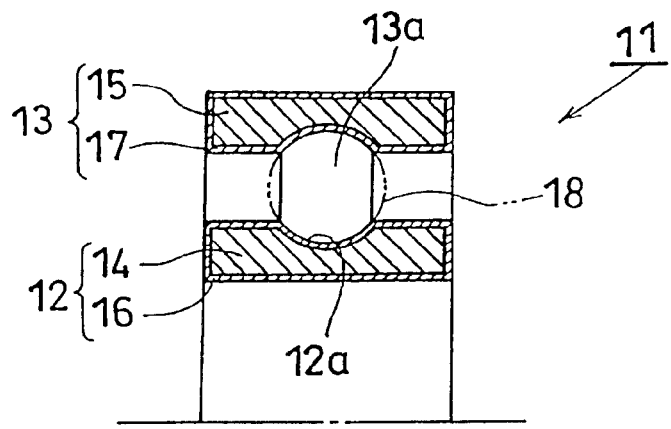
FIG. 4 shows a sectional view of main structure of the roller bearing as second embodiment of the present invention.

FIG. 4 shows a roller bearing as a second embodiment of the present invention. And, a basic structure of the roller bearing 11 is identical with the one shown in FIG. 2, so that here, the primary portion is shown and the whole structure is omitted in explanation. The feature of the second embodiment resides in that an inner ring 12 and an outer ring 13 are respectively made of a basic body 14 and 15 made of ferrous material such as bearing steel and stainless steel, and the whole surfaces of which are laminated with a glass layer 16, 17. Here, although the glass layer 16, 17 comprises of a polycrystalized silicate glass which is used for manufacturing the inner ring 2 and the outer ring 3 of the first embodiment, rather in this case, alkali silicate glass is preferable from the view point of adhesion of the silicate glass to the base body.

Figure 5:
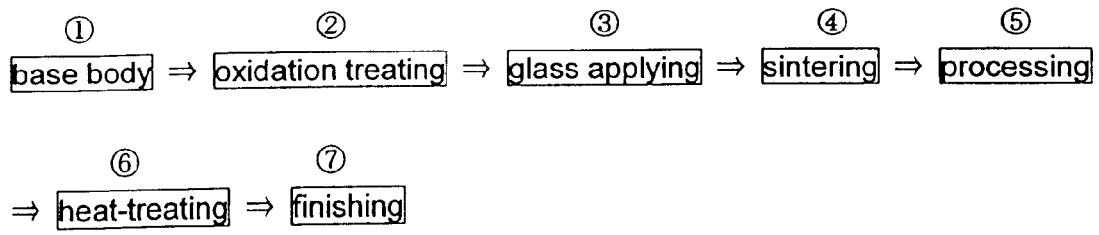
FIG. 5 shows a block diagram illustrating manufacturing steps in second embodiment of the present invention.

In manufacturing the above inner ring 12 and outer ring 14, as shown in FIG. 5, first, using a ferrous material the base body 14 and 15 is prepared (①), subsequently, on the surface of the base body 14, 15 an oxidation treatment is applied for increasing the adhesiveness between the metal and the glass (②). On the other hand, a glass composition, which is composed by containing a glass powder in such a manner as it becomes a predetermined proportion is prepared, and making use of a spray method or immersion method the glass composition is applied on the surface of the base body 14, 15 in a given thickness (③), after drying, a sintering treatment is carried out at a given temperature (more than 1500° C.) in accordance with the kind of glass in a heating furnace (④). After that, as well as the first embodiment, the working of the rolling surface of the ball and the guide groove of the container is carried out, and if necessary, working on the inner and outer diameter and the end face is carried out(⑤), subsequently, a heat treatment for polycrystalizing of the glass at a predetermined temperature (1000–1600° C.) (⑥), further, on the rolling surface of the ball a chemical polishing using, for example, a hydrofluoric acid solvent is carried out and finished the surface of the ball to a mirror surface, and on occasion, to the portion other than ball rolling surface a surface denaturation treatment due to an ion exchanging method is applied (⑦), thereby the inner ring 12 and the outer ring 13 are-finished.

According to the second embodiment, since the inner ring 12 and the outer ring 13 are formed with polycrystalized glass layer merely in the surface layer thereof, compared with the above the first embodiment, the minute change in dimension due to thermal expansion is a little larger, however, compared with the conventional inner and outer ring made of ferrous material the dimension change due to the thermal expansion is sufficiently small to guarantee the revolution precision.

Further, since the rolling surface 12a, 13a of the inner ring 12 and outer ring 13 bear a high hardness due to the polycrystalizing of the glass layer 16, 17, as well as in the first embodiment, the surface coarsening is prevented to enable the revolution vibration and revolution noise derived therefrom to diminish, in addition, the heat resistance and the anti-corrosion become sufficient.

Here, although the ball 18 may be formed with a new ceramics selected from the ferrous material such as the conventional bearing steel and stainless steel, or various kind of oxides, nitrides and carbides, as well as the above inner ring 12 and outer ring 13, these may be formed with the base body laminated with the glass layer. Further, as to the retainer (not shown), it may be formed, as well as the conventional one, with what is made of the conventional ferrous material, if the anti-corrosive property is important, it may be formed preferably from a resin or a sintered metal alloy.

Figure 6:
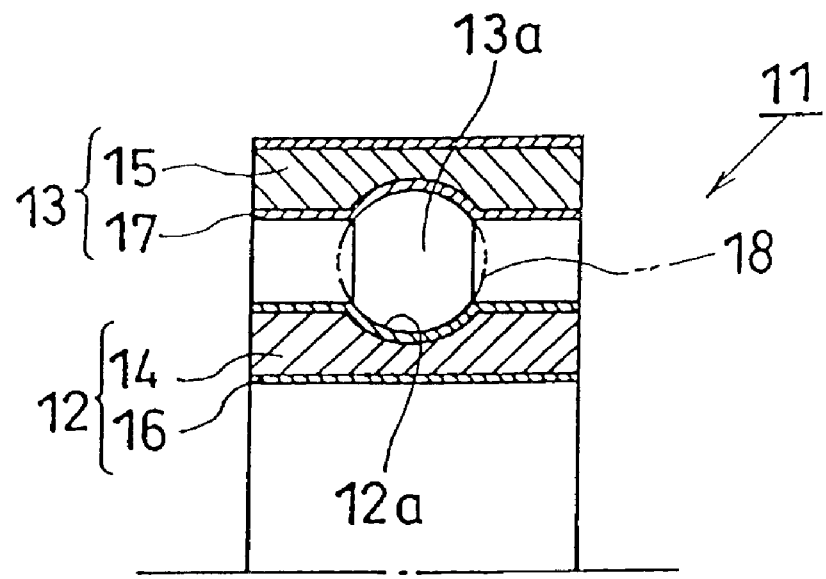
FIG. 6 shows a sectional view of modified structure of the roller bearing as second embodiment of the present invention.

For reference, in the above second embodiment of the present invention, although, as to the inner ring 12 and the outer ring 13, whole surface of the base bodies 14, 15 thereof is adapted to be laminated with the glass layer, this glass layer 16, 17 may applied, as shown in FIG. 6, merely on the inner diameter side or the outer diameter side and in this case too, the above effect as well as the second embodiment is expected.

In addition, in the above 1st and 2nd embodiments, a bearing is structured as so called ball bearing which uses balls 5 or 18 as a roller, however it is a matter of course that it is structured as a roller bearing in which rollers are used.

Figure 7:
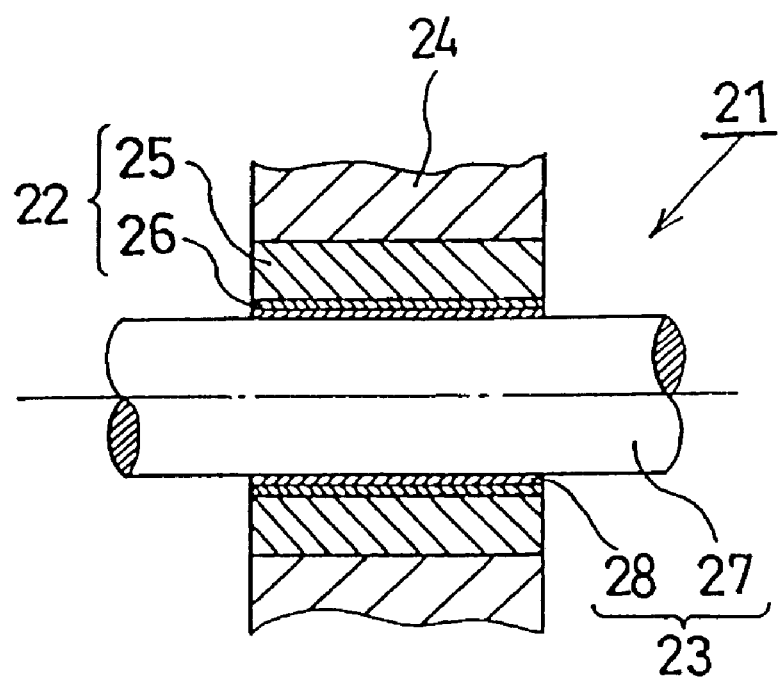
FIG. 7 shows a sectional view of structure of slider bearing as third embodiment of the present invention.

FIG. 7 shows a sliding bearing as 3rd embodiment. This sliding bearing 21 comprises a bearing body 22 which is a sleeve like and a shaft (journal) 23 pivoted at the bearing body 22, and the bearing body 22 is coupled with and maintained by the housing 24. The bearing body 22 comprises a base body 25 formed with a ferrous material such as bearing steel and stainless steel, and the glass layer 26 laminated on the inner circumference of the base body 25, on the other hand, the shaft 23 is consisted of a shaft body 27 formed with a various kind of ferrous materials and a glass layer 28 laminated on the outer circumference of the shaft body 27. Here, said glass layers 26 and 28 are consisted of the polycrystalized silicate glass which is used for the inner ring 2 and the outer ring 3 of the first embodiment. For reference, the glass layer 28 of the shaft 23 here is formed in a limited manner at the coupling portion with the shaft body 27.

In the third embodiment of the present invention, the manufacturing process of the bearing body 22 and the shaft 23 as constitutional elements of the sliding bearing 21, is substantially identical with the manufacturing process (FIG. 5) of the inner, outer rings 12, 13 in the second embodiment, and since thus obtained sliding bearing 21 is formed with the polycrystalized glass layer 26, 28 in its the surface layers including a bearing surface 22a of the bearing body 22 and the shaft 23, as well as the second embodiment the minute change in dimension becomes small. And, since the bearing surface 22a of the bearing body 22 and the circumference of the bearing body 23 have a high hardness due to the existence of the polycrystalized glass layer 26, 28, as well as the first and second embodiment, the surface coarsening is prevented to enable the revolution vibration and revolution noise derived therefrom to diminish, in addition, the heat resistance and the anti-corrosion become sufficient. Further, in this 3rd embodiment, whole of the bearing body 22 may be formed with glass.

As mentioned above, according to the bearing of the present invention, since whole of the constitutional elements of the bearing or at least roller rolling surface or bearing surface is covered with the polycrystalized glass, the deterioration of the revolution precision due to the minute change in dimension due to the thermal expansion, is prevented, thereby it will become suitable for the appliances which require a high revolution precision.

Further, due to the existence of hard glass, the surface coarsening due to the wearing of the bearing and the being engaged with different materials is prevented, and the strength of the bearing is increased, and it is expected to diminish the vibration noise and to prevent effectively from being damaged by an impact of a miniaturized appliance and to distribute to increase the endurance and reliability.

In addition, due to the existence of the glass, since the heat resistance and the anti-corrosion are increased, a stable use under a high temperature environment and a corrosive environment become possible, which causes to be easily stained to improve its appearance and to widen its applicable area.

What is claimed is:

1. A sliding bearing having a body for receiving a shaft, characterized in that the entire sliding bearing body or at least a surface layer including a sliding bearing surface and all of the shaft or at least a surface layer of a portion of the shaft to be received by the sliding bearing body is formed with polycrystallized glass.

2. A sliding bearing according to claim 1, wherein the glass is silicate glass.

3. A sliding bearing according to claim 2, wherein the silicate glass is one selected from the group of high silicate glass, a soda-lime glass, an aluminosilicate glass, a borosilicate glass and an alkali silicate glass.

4. A sliding bearing according to claim 1, wherein the bearing body comprises a ferrous material.

5. A sliding bearing according to claim 4, wherein the ferrous material is bearing steel or stainless steel.

6. A sliding bearing according to claim 1, wherein the shaft has a shaft body comprising a ferrous material.

7. A sliding bearing according to claim 1, wherein the shaft has a body and further comprising a glass layer located on the outer circumference of the shaft body.

* * * * *

UNITED STATES PATENT AND TRADEMARK OFFICE
CERTIFICATE OF CORRECTION

PATENT NO.     : 6,527,447 B2
DATED          : March 4, 2003
INVENTOR(S)    : Rikuro Obara It is certified that error appears in the above-identified patent and that said Letters Patent is hereby corrected as shown below:

<u>Title page,</u>
Item [54], should be -- BEARING AND METHOD FOR MANUFACTURING THE SAME --

Signed and Sealed this

Sixteenth Day of September, 2003

JAMES E. ROGAN
*Director of the United States Patent and Trademark Office*